DIETZ & DUNHAM.
Reaping and Mowing Machine.
No. 12,999.
Patented June 5, 1855.
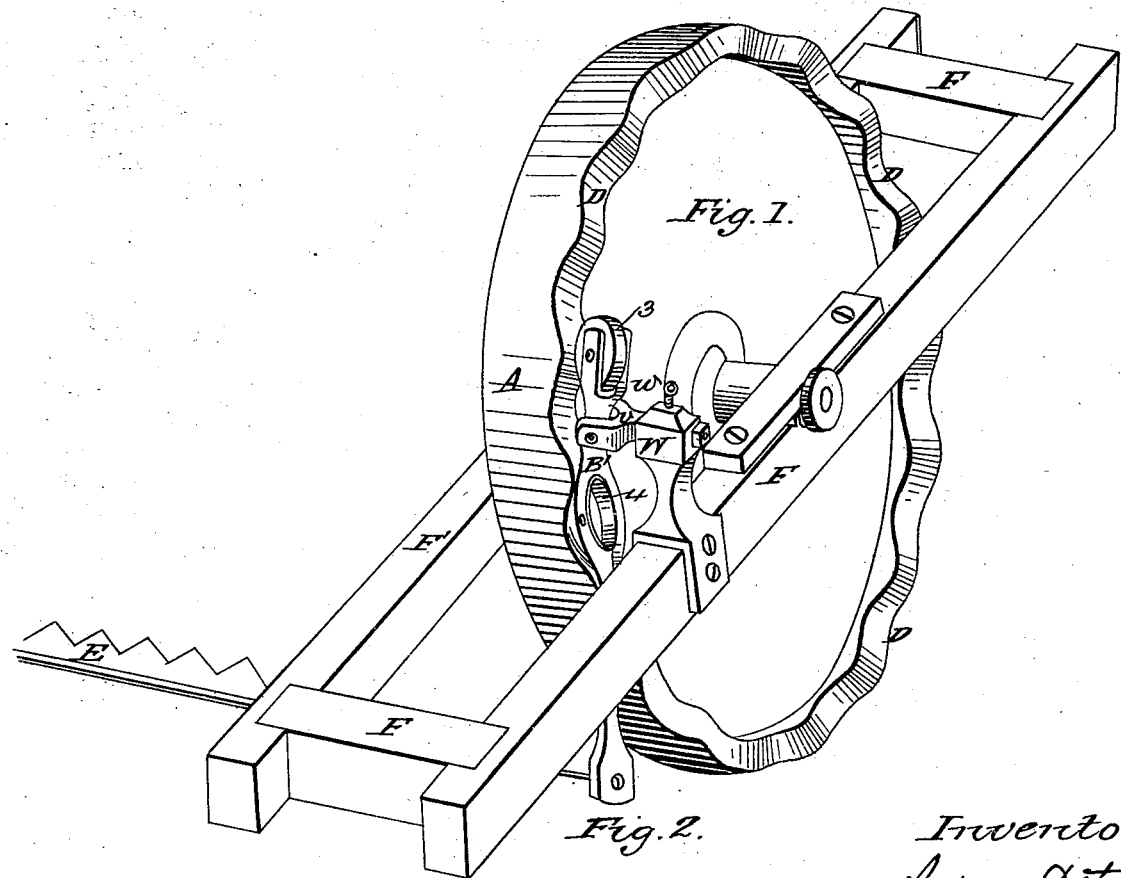

UNITED STATES PATENT OFFICE.

ANDREW DIETZ AND JNO. G. DUNHAM, OF RARITAN, NEW JERSEY.

IMPROVEMENT IN REAPING AND MOWING MACHINES.

Specification forming part of Letters Patent No. 12,999, dated June 5, 1855.

*To all whom it may concern:*

Be it known that we, ANDREW DIETZ and JOHN G. DUNHAM, of Raritan, Somerset county, and State of New Jersey, have invented certain new and useful Improvements in the Construction of Mowing and Reaping Machines; and we do hereby declare that the following is a full and exact description thereof, reference being had to the accompanying drawings, and to the letters of reference marked thereon.

The nature and character of our present invention is generally similar to our former invention, and for which Letters Patent of the United States were granted to us bearing date the 27th March, 1850, but greatly simplifies our said former invention, and also much increases the effective power of the mower or reaper, friction being greatly lessened and the draft rendered easier.

We have and make use of a driving-wheel, A, made of cast-iron or of wood, with a strong hub and heavy spokes, (or it may be cast or made solid,) and having a solid tire or felly about eight inches broad and two or three inches deep. Upon one side of this driving-wheel we place a cam-surface, D, which may be cast on the wheel or fastened firmly to it, and from which a vibratory motion is given to the cutter-bar E. Our former invention required similar cam-surfaces upon each side of the driving-wheel and the use of double levers to give the proper motion to the cutter-bar; but our present invention, besides other peculiarities, dispenses with the necessity and use of such a cam-surface, except upon one side or face of the driving-wheel, and substitutes a single simple or straight lever in the place of such double lever. The driving-wheel is generally about three feet in diameter, and the cam-surface D is so constructed that the distance between the highest points of any two cams (or the length of any one cam) shall be about six inches and the depth of the cams be about three-quarters of an inch, or sufficient to give through the lever B' the necessary vibratory motion to the sickle. The length of each cam has to correspond with the cutting range of one vibration of the cutter-bar, so that the machine shall travel neither more nor less than the cutter-bar, by its construction, can really cut during the progress of the machine. The perpendicular depth of the teeth of the cutter-bar is three inches, and as they can cut at every vibration neither more nor less than six inches, every cam must therefore have a length of the same number of inches, which, for a wheel assumed to be three feet in diameter, will give eighteen cams, and consequently eighteen vibrations of the cutter-bar, during the traveling of the wheel over nine feet of ground. This proportion has heretofore been overlooked, and is the cause of the partial or total failure of so many harvesters, it being evident that a cutter-bar traveling over more ground than it can cut will leave some part of the grain or grass uncut, and also foul the machine and hinder its progress, while a cutter-bar traveling over less ground than it can cut wastes power to no purpose. It therefore follows that the correspondence of the length of the cam with the cutting range of the cutter-bar is of paramount importance and the real key to the efficiency of such machines. The lever B' is about twenty inches long in its entire length and about four and one-half inches from its upper end to the fulcrum V, in which it is supported, as shown in the drawings. This fulcrum V rests in the chair or stand W and moves backward and forward therein, and is fastened by a screw, w. This arrangement renders it easy to throw the machine out of gear, it being only necessary to loosen this screw w, when the natural motion of the driving-wheel pushes back the fulcrum V, and with it the lever B' and cutter-bar E. The chair W is bolted to the frame F, such bolts being secured by nuts to allow the change in position of this chair, for the purposes hereinafter specified. In the lever B' we place two friction rollers or wheels, 3 4, as represented in the drawings, both of the same size, (about four inches in diameter,) and so placed in the lever in respect to each other that one shall be at the highest point of one cam when the other is at the lowest depression of the following cam.

It is believed that the form and arrangement above described of the cam-surfaces and the length of the lever and the size of its friction-rollers and the manner of their movements in the several cams will be as perfect and desirable as any in securing complete and easy action to the sickle; but the distance between the two rollers 3 4 may be a trifle less or greater without materially injuring the effective action of the machine, and the lateral vibration of the cutter-bar may be varied by increasing the depth of the cam or increasing the length of the lever below its fulcrum, and the particular shape of the cam-surface may also be varied with a corresponding change in the size of the friction-wheels without interfering with the distinguishing characteristic of our improvement, imparting motion to the sickle directly from the driving-wheel.

By our present improved and simplified arrangement and invention we are also able to cut either a right or left swath. To obtain this end, which is frequently desirable, it is only necessary to loosen the bearings of the wheel A upon one side of the frame and then change or reverse the position of this wheel and transfer the chair or stand W to the opposite side of the frame, transferring also the support of the cutter-bar below the frame; or this lower support may be easily so constructed as to allow either a right or left motion of the cutter-bar. In ordinary harvesters such a variation in the direction of the action of the machine is not possible, though often much to be desired.

The result of our invention and improvement is to simplify the construction of the reaper, reduce friction in its operation, and increase its capability, thus producing a machine which, with a given power, will in a given time accomplish a greater amount of labor and with greater ease to the beasts working it.

We are aware that the cutter-bar has been worked by the action of cams on the surface of the driving-wheel by means of rollers set in levers when such rollers clamp the wheel between them, as in our former patent of March 27, 1855, and also when the lever extends across the face of the wheel; but in the former case the mechanical arrangement is necessarily somewhat complicated, and in the latter case the great length of the levers from their points or center of oscillation renders them liable to vibration and tends to spread the machine, and thus interferes with and prevents the proper and effectual transmission of motion to the cutter-bar, and an additional lever is also necessary to connect the one extending across the face of the wheel with the cutter-bar, thus complicating the whole arrangement; and we therefore do not now claim either of the above ways or modes of working the cutter-bar; but

What we claim as our invention, and desire to secure by Letters Patent, is—

The use, for the purpose of transferring motion from the driving-wheel to the cutter-bar, of a short lever, B', the center of oscillation of which is over the cam-flange itself, the rollers being but a cam and a half apart, or its equivalent, the whole arranged substantially as above described.

ANDREW DIETZ.
JOHN G. DUNHAM.

Witnesses:
S. D. LAW,
SAMUEL P. BELL.